(12) United States Patent  
Ioannidis et al.

(10) Patent No.: US 12,551,050 B2
(45) Date of Patent: Feb. 17, 2026

(54) BEVERAGE MACHINE WITH CAPSULE IMAGING

(71) Applicant: Keurig Green Mountain, Inc., Burlington, MA (US)

(72) Inventors: Nicholas George Ioannidis, Tewksbury, MA (US); Robert Dana Cassano, Natick, MA (US); Joseph George Fucci, Amherst, NH (US)

(73) Assignee: Keurig Green Mountain, Inc., Burlington, MA (US)

( * ) Notice: Subject to any disclaimer, the term of this patent is extended or adjusted under 35 U.S.C. 154(b) by 936 days.

(21) Appl. No.: 17/640,274

(22) PCT Filed: Sep. 21, 2020

(86) PCT No.: PCT/US2020/051750
§ 371 (c)(1),
(2) Date: Mar. 3, 2022

(87) PCT Pub. No.: WO2021/061553
PCT Pub. Date: Apr. 1, 2021

(65) Prior Publication Data

US 2022/0330742 A1 Oct. 20, 2022

Related U.S. Application Data

(60) Provisional application No. 62/904,805, filed on Sep. 24, 2019.

(51) Int. Cl.
*A47J 31/44* (2006.01)
*A47J 31/36* (2006.01)

(52) U.S. Cl.
CPC ....... *A47J 31/4492* (2013.01); *A47J 31/3676* (2013.01)

(58) Field of Classification Search
CPC ................ A47J 31/4492; A47J 31/3623; A47J 31/3633; A47J 31/3676
See application file for complete search history.

(56) References Cited

U.S. PATENT DOCUMENTS 10,117,540 B2 * 11/2018 De Vreede .......... A47J 31/4492
10,485,376 B2 * 11/2019 Van Den Aker .... A47J 31/3642
(Continued)

FOREIGN PATENT DOCUMENTS

| CA | 3046722 A1 | 6/2018 |
| CA | 3046855 A1 | 6/2018 |

(Continued)

OTHER PUBLICATIONS

PCT/US2020/051750, Feb. 25, 2021, International Search Report and Written Opinion.

(Continued)

*Primary Examiner* — Reginald Alexander
(74) *Attorney, Agent, or Firm* — Wolf, Greenfield & Sacks, P.C.

(57) ABSTRACT

A beverage machine arranged to image at least a portion of a capsule held by a beverage forming station of the machine. Parts of the beverage forming station may be movable between open and closed positions, and a portion of the capsule may be imaged while parts of the forming station are between open and closed positions. A capsule image may be captured only when forming station parts are moved toward the closed position, and image date discarded if the forming station is moved toward the open position prior to beverage formation.

17 Claims, 7 Drawing Sheets

(56) References Cited

U.S. PATENT DOCUMENTS

| | | | |
|---|---|---|---|
| 10,667,646 B2 * | 6/2020 | de Graaff | A47J 31/4492 |
| 2013/0014648 A1 | 1/2013 | Rognon et al. | |
| 2017/0341856 A1 | 11/2017 | Aschwanden | |

FOREIGN PATENT DOCUMENTS

| | | | |
|---|---|---|---|
| CN | 102711566 A | 10/2012 |
| CN | 102781290 A | 11/2012 |
| CN | 105147110 A | 12/2015 |
| CN | 204970878 U | 1/2016 |
| CN | 107105923 A | 8/2017 |
| CN | 108778070 A | 11/2018 |
| EP | 3 082 523 A1 | 10/2016 |
| WO | WO 2015-091301 A1 | 6/2015 |
| WO | WO 2017-132452 A2 | 8/2017 |
| WO | WO 2019-180522 A1 | 9/2019 |
| WO | WO 2020-012409 A1 | 1/2020 |
| WO | WO 2020-092472 A2 | 5/2020 |
| WO | WO 2009-007292 A1 | 1/2022 |

OTHER PUBLICATIONS

PCT/US2020/051750, Apr. 7, 2022, International Preliminary Report on Patentability.

International Search Report and Written Opinion mailed Feb. 25, 2021, in connection with International Application No. PCT/US2020/051750.

International Preliminary Report on Patentability mailed Apr. 7, 2022, in connection with International Application No. PCT/US2020/051750.

* cited by examiner

//BEVERAGE MACHINE WITH CAPSULE IMAGING

CROSS REFERENCE TO RELATED APPLICATION

This application is a national stage filing under 35 U.S.C. § 371 of International Patent Application No. PCT/US2020/051750, filed Sep. 21, 2020, which claims the benefit of U.S. Provisional Application No. 62/904,805, filed Sep. 24, 2019. The contents of these applications are hereby incorporated by reference in their entireties.

FIELD OF INVENTION

Features of the invention relate to beverage machines, and more particularly to beverage machines arranged to image at least a portion of a capsule held by the machine.

BACKGROUND

Beverage machines are widely used to make beverages using capsules that contain ingredients, such as coffee grounds, tea leaves, and/or other soluble and/or insoluble materials. Such beverage machines can often be used with capsules containing a wide variety of different ingredients so as to make different beverages, such as coffee, tea, hot chocolate, flavored still drinks, flavored carbonated drinks, and so on. Some beverage machines, such as that described in U.S. Pat. No. 7,032,818, are capable of reading a tag on a capsule to identify preparation instructions used to prepare a beverage using the capsule.

SUMMARY OF INVENTION

Aspects of the invention relate to a beverage machine including a beverage forming station including a capsule holder arranged to hold a capsule containing capsule ingredients to form a beverage. The beverage forming station includes at least one part that is movable between open and closed positions, the open position being one in which the capsule may be provided to the capsule holder, and the closed position being one in which the capsule is at least partially enclosed and usable to form a beverage. For example, a lid of the forming station may be arranged to cooperate with the capsule holder to at least partially enclose the capsule held by the capsule holder with the lid and capsule holder in a closed position. The lid and capsule holder may be movable relative to each other between an open position in which the capsule is receivable into the capsule holder and the closed position. For example, the lid may be pivotally mounted to a housing of the beverage machine so as to be movable relative to the capsule holder between open and closed positions. The machine may include a precursor liquid supply including components to supply a precursor liquid used to form the beverage with the capsule ingredients, e.g., a liquid conditioner may heat and/or cool water or other precursor liquid and a pump may provide heated/cooled liquid under pressure to the capsule held by the capsule holder to form a beverage. An imaging device may be associated with the forming station, e.g., mounted to the lid, and arranged to capture an image of a portion of the capsule in the capsule holder, and control circuitry may be arranged to control the imaging device to capture the image of the portion of the capsule in the capsule holder when at least one part of the forming station is between open and closed positions, e.g., when the lid and the capsule holder are between the open and closed positions. For example, the control circuitry may be arranged to control the imaging device to image the portion of the capsule only when the lid and capsule holder are moved relative to each other toward the closed position. In one embodiment, the control circuitry is arranged to control the imaging device to image the portion of the capsule only when the lid is moved toward the closed position. By imaging a portion of the capsule as the parts of the forming station are moved toward the closed position, the machine may help ensure that the capsule image accurately represents the capsule that is actually used to form a beverage, as well as reduce any delay required to image the capsule and process the image, e.g., to decode any machine readable indicia on the capsule used to determine beverage preparation parameters, such as water temperature, beverage volume, etc. In one particular embodiment, the lid is configured to be in a horizontal position when in the closed position, and to be at an angle above the horizontal position when in the open position. The imaging device may be mounted to the lid and have an optical axis that is oriented vertically downwardly when the lid is between the angle above the horizontal position at the open position and the horizontal position. The control circuitry may control the imaging device to image the portion of the capsule when the optical axis is oriented vertically downwardly, i.e., when the lid is between the open and closed positions.

In some embodiments, the imaging device is arranged to capture an image of a portion of a lid of the capsule. The lid of the capsule may include machine readable indicia including a barcode, alphanumeric text and/or a logo, and the image captured may include one or more of the indicia. For example, the machine readable indicia may include a barcode and alphanumeric text, and the captured image includes the barcode and alphanumeric text. The control circuitry may be adapted to decode the barcode and alphanumeric text from the image, e.g., the barcode may include information regarding a type of beverage to be made using the capsule, beverage preparation parameters to be used by the beverage machine, a manufacturer name, etc. The alphanumeric text may include a beverage type, brand name, authentication code, etc. In some embodiments, the beverage machine may include a user interface including a display, and the control circuitry may be adapted to present visual information regarding the capsule in the capsule holder on the display based on the image of the portion of the capsule. For example, the control circuitry may display the type of beverage being made using the capsule, as well as other information, such as a recommended volume and/or strength for the beverage, options for the user to adjust the volume or other parameters (such as temperature, strength, etc.). Such information may be displayed before or at the time that the beverage forming station parts, e.g., the lid, reaches a closed position. If the image reveals that no capsule is present in the capsule holder, information regarding no capsule being present may be displayed.

In some cases, a beverage machine may send capsule image data to a remote computer, such as a network server, which may analyze the image data and send information back to the beverage machine, e.g., regarding beverage machine parameters, information to be displayed on the machine to a user, etc. In some cases, when the beverage machine is not connected to the network, the beverage machine may decode the machine readable indicia included in a capsule image. Otherwise, the machine may not decode the indicia and instead may rely on a remote server for decoding, etc.

In some embodiments, the imaging device includes components to aid in imaging of the capsule portion, such as a lighting element arranged to illuminate the portion of the capsule. The control circuitry may be arranged to control the lighting element to illuminate the portion of the capsule only when the lid and the capsule holder are between the open and closed positions. Otherwise, the lighting element may be deactivated.

Aspects also relate to determining a user's need for capsule replenishment based on beverage machine usage and past purchase history. That is, a beverage machine and/or a remote server may track a user's consumption of capsules, may compare this value to the user's past capsule purchase history, and may determine if the user's supply of capsules is below a threshold value (e.g., below a week's worth of capsules). Consumption may be determined based on capsule image data that the beverage machine captures and/or sends to the remote computer. For example, the remote computer may tally the number of capsule images that have been taken by the beverage machine to determine the number of capsules that have been used. The remote computer also may process the capsule image data to determine not only the number of capsules that have been used, but also the type of capsules. In other examples, the remote computer need not use or receive capsule image data in order to track consumption. That is, the remote computer may track capsule consumption without having any knowledge of the identity of the capsule (e.g., the brand or beverage ingredients). For example, the remote computer may use beverage preparation parameters to determine the number of beverage preparation events at the beverage machine, and may extrapolate the number of capsules that have been used from that value.

In these examples, the remote computer may notify the user when the user's supply of capsules is below a threshold value. For example, the remote computer may send the user a notification to purchase additional capsules or may send the user a notification that capsules will be automatically shipped to the user (e.g., if the user already has an automatic subscription to purchase the capsules).

According to one embodiment, a system for assessing usage of a beverage machine is disclosed. The beverage machine includes a capsule holder arranged to hold a capsule containing ingredients and use the capsule ingredients to form a beverage, the capsule holder arranged to operate with multiple different types of capsules, a precursor liquid supply including components to supply a precursor liquid used to form the beverage with the capsule ingredients, and control circuitry arranged to control components of the precursor liquid supply to form a beverage using a capsule in the capsule holder, the control circuitry including a beverage machine data module arranged to combine and send, to a remote computer system via a network and for each beverage preparation operation, a communication including information regarding beverage preparation parameters used to make a beverage during the beverage preparation operation. The remote computer system includes a communications interface arranged to receive communications regarding beverage preparation operations including beverage preparation parameters, the communications interface not receiving information from the beverage machine regarding identification information for capsules used by the beverage machine, a memory arranged to store the beverage preparation parameters for each beverage preparation operation and to store information regarding historical capsule purchases associated with the beverage machine; and an order processing module arranged to direct the sending an offer to purchase or shipment of a specific type of capsule to a user associated with the beverage machine based on the historical capsule purchase information and the beverage preparation parameter information for the beverage machine.

These and other aspects of the invention will be apparent from the following description and claims.

BRIEF DESCRIPTION OF THE DRAWINGS

Aspects of the invention are described with reference to the following drawings in which like numerals reference like elements, and wherein.

DETAILED DESCRIPTION

It should be understood that aspects of the invention are described herein with reference to the figures, which show illustrative embodiments. The illustrative embodiments described herein are not necessarily intended to show all embodiments in accordance with the invention, but rather are used to describe a few illustrative embodiments. For example, aspects of the invention are described with reference to a specific capsule arrangement, but aspects of the invention are not limited to the capsule arrangements described herein. Thus, aspects of the invention are not intended to be construed narrowly in view of the illustrative embodiments. In addition, it should be understood that aspects of the invention may be used alone or in any suitable combination with other aspects of the invention.

Figure 1:
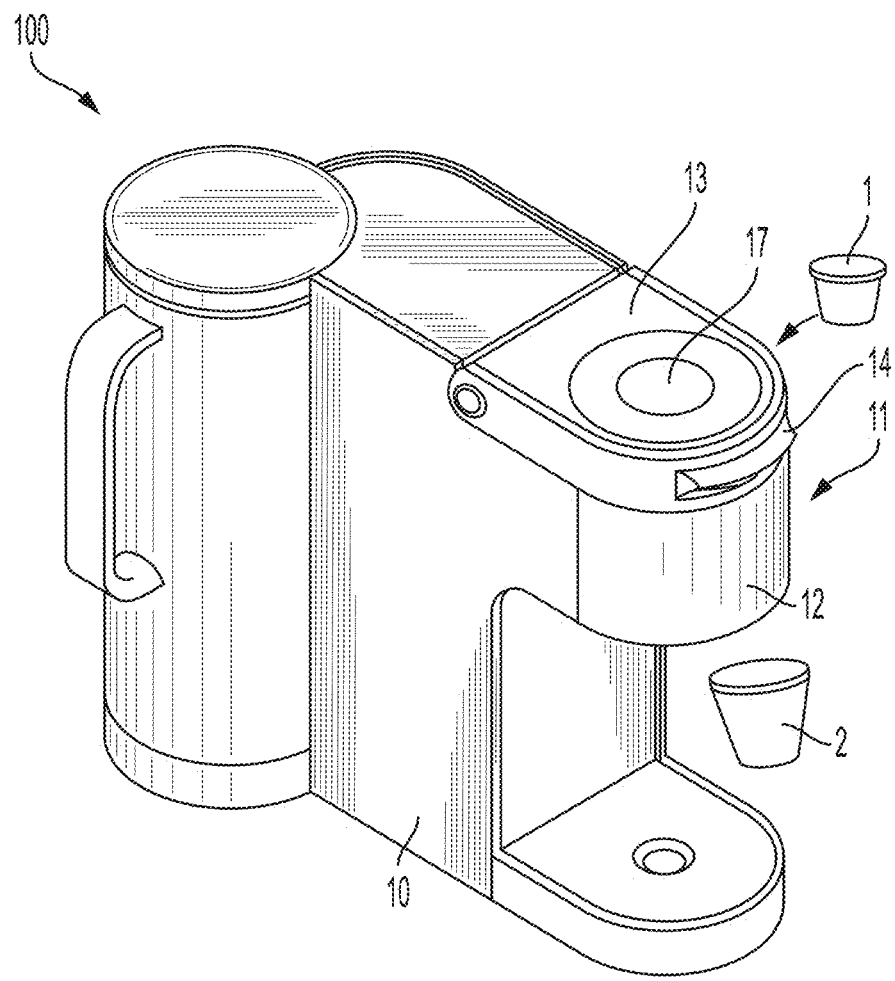
FIG. 1 is a perspective view of a beverage machine with an imaging device located at a beverage forming station in an illustrative embodiment.

FIG. 1 shows a perspective view of a beverage machine 100 in an illustrative embodiment that incorporates aspects of the invention. For purposes herein, the beverage machine 100 may be used to form any suitable beverage, such as tea, coffee, other infusion-type beverages, carbonated beverages, beverages formed from a liquid or powdered concentrate, soups, juices or other beverages made from dried materials, or others. As will be appreciated, the beverage machine may produce hot and/or cold beverages. In the illustrative embodiment of FIG. 1, the machine 100 is arranged to form coffee or tea beverages (e.g., as a beverage brewer). As is known in the art, a beverage capsule, such as beverage capsule 1, may be provided to the machine 100 and used to form a beverage that is deposited into a container 2, such as a user's cup, carafe or other. The capsule 1 may be manually or automatically provided to a beverage forming station 11 of the beverage machine 100. For example, the beverage forming station 11 may include a capsule holder 12 that is exposed to receive the capsule 1 when the user (or machine controller) operates a handle or other actuator 14 to move a lid or other cover 13 with respect to the capsule holder 12. With the capsule 1 placed in the capsule holder 12, the capsule holder 12 and lid 13 may be moved relative to each other to at least partially enclose the capsule 1, e.g., so that water or other precursor liquid can be introduced into the capsule 1 to form a beverage. For example, with the capsule 1 held in the beverage forming station 11, the capsule 1 may be pierced to form inlet and outlet openings through which water or other precursor liquid enters the capsule 1 and beverage exits the capsule 1, respectively. U.S. Pat. No. 8,361,527 describes a capsule and a system for introducing liquid into the capsule that may be used in an embodiment of this invention, and is hereby incorporated by reference in its entirety. A user may receive information from, and/or provide information to, the beverage machine 100 via a user interface 17, which may include a display, buttons, touch screen and/or other elements for information display and reception.

Figure 2:
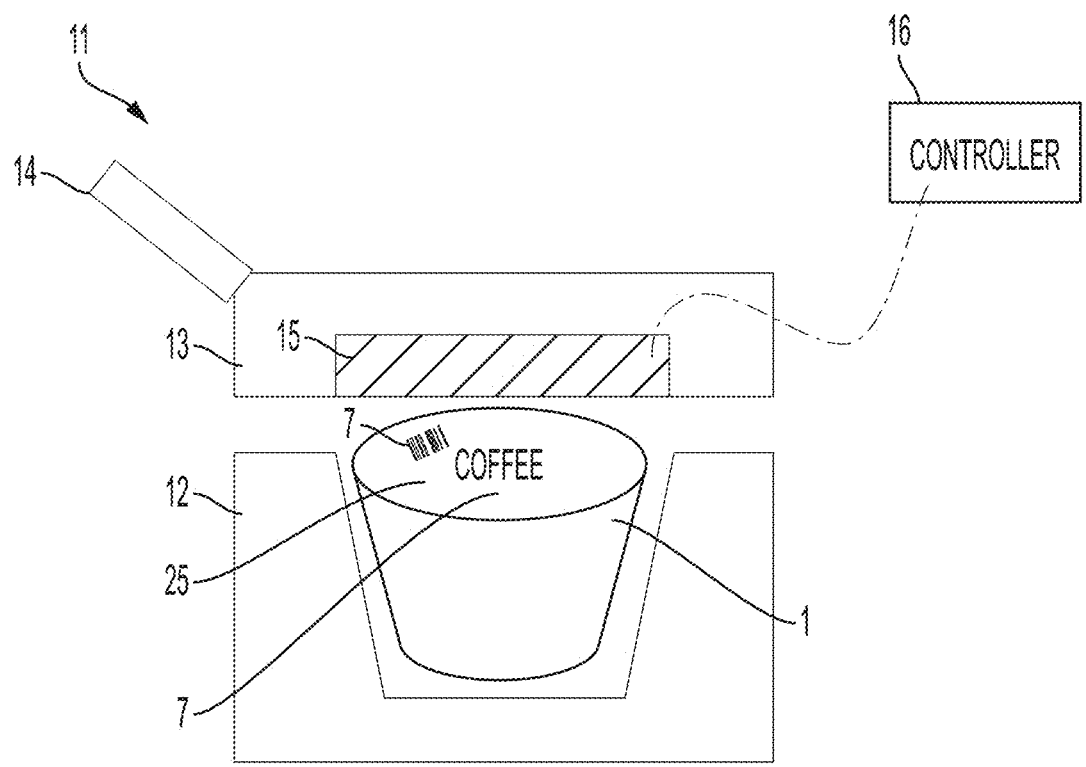
FIG. 2 is a schematic view of the beverage forming station in the FIG. 1 embodiment showing a capsule imaging system.

According to one aspect, as shown schematically in FIG. 2, the beverage forming station 11 includes an imaging device 15 arranged to capture an image of a portion of the capsule 1. In some cases, the imaged portion of the capsule may include one or more machine readable indicia 7 such as alphanumeric text, a barcode (e.g., a 2D or 3D barcode), RFID tag, inductive element, magnetic strip or other element, optically sensed element (e.g., visible or invisible text, graphics, color), physical structures or other indicia arranged to indicate a characteristic of the capsule. Characteristics indicated by indicia 7 on the capsule 1 may include a manufacturer name or location, a brand name or logo, a type of beverage ingredient in the capsule or beverage to be made using the capsule, instructions and/or machine settings for use in preparing a beverage using the capsule, an authentication code or other information that permits the machine 100 to operate using the capsule, etc. In some embodiments, as shown in FIG. 2, the imaging device 15 is mounted to the lid 13 of the beverage forming station 11 and is arranged to capture an image of a portion of a top or lid 25 of the capsule 1. Of course, other portions of a capsule may be imaged, and the portion that is imaged need not necessarily include indicia 7. An image captured by the imaging device 15 may include one or more indicia 7 on the capsule 1, e.g., an image may include both text and a barcode on the lid 25 of the capsule as shown in FIG. 2. In some embodiments, the imaging device 15 may capture an image of the entire lid 25 of the capsule 1. The imaging device 15 may be arranged to capture two or more images of a portion of the capsule 1, such as by scanning across the lid 25 of the capsule, and the imaging device 15 may include two or more image sensors, such as a camera or other image sensor for visible light, infrared light, ultraviolet light, or other electromagnetic radiation. Multiple sensors may be employed to image an area of the capsule 1, e.g., images captured by multiple sensors may be stitched together to form a single image or otherwise used. The imaging device 15 may include illumination devices, such as one or more LEDs or other devices to illuminate a portion of the capsule 1 that is imaged. Such illumination devices may be positioned in any suitable way, e.g., to illuminate a portion of the capsule 1 so a desired image of the capsule portion can be captured. Illumination may be useful when imaging in dark areas or otherwise in low levels of ambient light, and/or to cause indicia 7 or other features on the capsule 1 to emit a detectable signature. For example, the capsule 1 may include fluorescent paint or other elements that emit a visible or other light when illuminated by a particular wavelength or set of wavelengths. The imaging device 15 may thus excite such features by way of an illumination device and capture an image of the light emitted by the capsule 1 in response. The imaging device 15 may include a photocell or other light level sensor to detect whether an illumination device should be operated, e.g., a capsule portion may be illuminated if ambient light levels are below a threshold. The imaging device 15 may include other optical components as well, such as one or more lenses, light diffusers, filters, reflectors, light pipes, etc. whether used to illuminate the capsule portion or to receive and transmit imaging light.

As shown in FIG. 2, the imaging device 15 is operatively coupled to a controller 16 which includes control circuitry adapted to control operation of the imaging device 15, receive image data from the imaging device 15, perform image processing, decoding or other operations on the image data, and/or control other components of the beverage machine 100. In some embodiments, the controller 16 activates the imaging device 15 to capture an image of at least a portion of the capsule when the capsule is in the capsule holder 12. In some embodiments, the imaging device 15 captures an image of the capsule as parts of the beverage forming station 11 move relative to each other to at least partially enclose the capsule. For example, an image may be captured when a user interacts with the actuator 14 to move the lid 13 from an open position to a closed position with respect to the capsule holder 12. In other embodiments, the controller 16 may control the imaging device 15 to capture an image during beverage formation (e.g., after the capsule has been partially enclosed by the forming station 11 and water or other liquid is introduced into the capsule to form a beverage). The imaging device 15 also may be controlled to capture an image when beverage formation has completed (e.g., after a brew cycle), or when parts of the beverage forming station 11 are moved to uncover the capsule.

In some embodiments, the controller 16 may activate the imaging device 15 to capture the image according to a trigger mechanism or trigger criterion. In some embodiments, a trigger mechanism may detect the closing of the forming station 11 and in response the controller 16 may control the imaging device 15 to capture an image of at least a portion of the capsule 1. By capturing an image of the capsule 1 as the capsule 1 is being enclosed at the forming station 11, the controller 16 can ensure that the imaged capsule 1 corresponds to the capsule subsequently used to form a beverage, or even allow the controller 16 to detect that no capsule 1 is present in a capsule holder 12. For example, if a capsule 1 is imaged before movement begins at the forming station 11 to enclose the capsule 1, it is possible that a user may replace the imaged capsule 1 with another and then close the forming station 11. In this case, the controller 16 will not have an image of the capsule 1 that was actually used to form the beverage. In contrast, by imaging the capsule 1 as the capsule 1 is being enclosed by the forming station 11 (e.g., as the capsule holder 12 and lid 13—or other forming station parts—are being moved relative to each other from an open position to a closed position), the controller 16 can better ensure that the captured image properly corresponds to the capsule used to subsequently form a beverage. In addition, imaging the capsule as one or more parts of the forming station 11 are moved to enclose a capsule 1 allows the controller 16 to receive image data before the forming station 11 is closed. This allows the controller 16 to take suitable action, e.g., decoding image data, presenting brew options to a user on the user interface 17, etc., before or shortly after the forming station 11 is closed. This may reduce a wait time that a user may otherwise have to endure if the capsule 1 is imaged after the capsule is enclosed at the forming station 11. In some embodiments, the controller 16 may include one or more sensors to detect not only movement of forming station 11 parts toward a closed position, but also movement of the forming station 11 parts toward an open position. This can allow the controller 16, for example, to detect that a lid 13 is being moved toward a closed position and trigger the imaging device 15 to capture an image of a portion of the capsule, and if the controller 16 detects that the lid 13 moves toward an open position (e.g., allowing the capsule 1 to be removed before formation of a beverage), the controller 16 may discard the image data. By capturing and using only image data as a forming station 11 is being moved toward a closed position, the controller 16 can ensure that appropriate image data is corresponded with a subsequently formed beverage.

Figure 3:
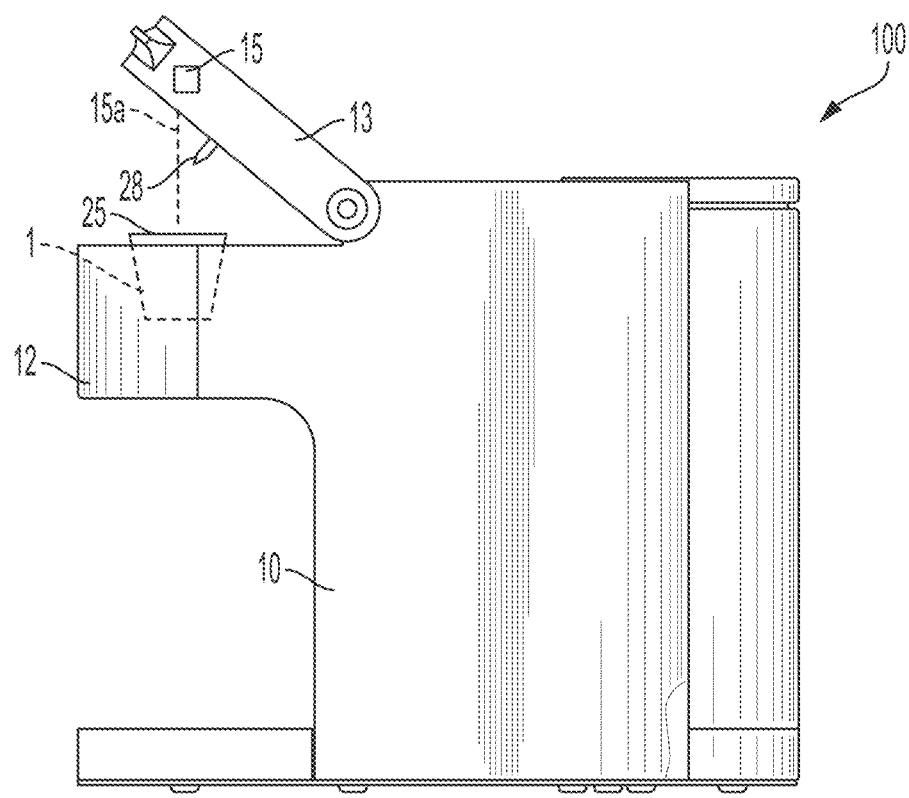
FIG. 3 is a side view of the FIG. 1 embodiment illustrating a point at which a capsule portion is imaged based on lid position.

In some embodiments, the controller 16 may control the imaging device 15 to capture an image of the capsule 1 when the imaging device 15 is properly positioned relative to the capsule 1. This may be done in different ways, such as by detecting the relative positions of the imaging device 15 and capsule 1, a position of the imaging device 15 relative to other portions of a beverage machine 100, and/or a position of a component of the beverage machine 100 to which the imaging device 15 is attached. For example, FIG. 3 shows an arrangement in which an imaging device 15 is mounted to a lid 13 of the beverage forming station 11. The lid 13 is movable relative to the capsule holder 12 between open and closed positions. In this embodiment, the imaging device 15 has an optical sensor with an optical axis 15a that extends generally downward and away from the lid 13. The optical axis 15a is a general line along which the imaging device 15 receives optical information for capturing an image, e.g., a field of view. The imaging device 15 is arranged so that a best quality image of the capsule 1 is generally captured when the optical axis 15a is perpendicular to the lid 25 of the capsule 1. Thus, the controller 16 may control the imaging device 15 to capture an image of the capsule 1 when the optical axis 15a is perpendicular to the lid 25 of the capsule 1. Determination of when the optical axis 15a is perpendicular to the lid 25 of the capsule 1 may be performed in different ways. For example, a trigger mechanism may include a sensor that detects when the lid 13 is at a particular angle relative to the remainder of the housing of the beverage machine 100 that corresponds to the optical axis 15a being oriented vertically. When the controller 16 determines that the lid 13 is at the particular angle (and optionally moving toward the closed position), the controller 16 may cause the imaging device 15 to capture an image of the capsule 1. The sensor may be a Hall effect sensor, potentiometer, encoder, an accelerometer or other suitable device to detect the position of the lid 13. Alternately, the sensor may detect a position of the imaging device 15 relative to the capsule 1, e.g., that the imaging device 15 is directly over the lid 25 of the capsule 1, which may trigger image capture. In another embodiment, the imaging device 15 may repeatedly capture image data as the lid 13 is being moved toward the closed position, and the controller 16 may determine which of the captured images includes a desired image of the capsule 1, e.g., by image analysis of the image data that reveals a particular image as including suitable characteristics indicative of a capsule lid 25.

Figure 4:
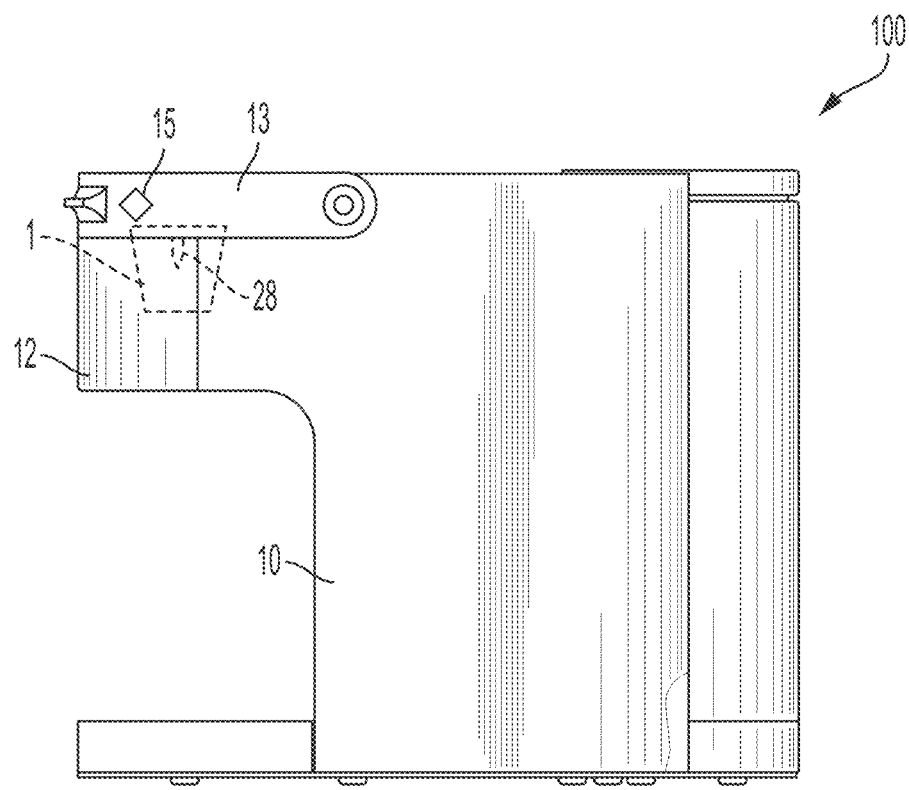
FIG. 4 is a side view of the FIG. 1 embodiment showing the lid in a closed position.

While FIG. 4 shows the lid 13 in the closed position in which the capsule 1 is at least partially enclosed for forming a beverage, the position of the lid in FIG. 3 where the optical axis 15a is perpendicular to the lid 25 of the capsule 1 may be the open position (i.e., the farthest extent to which the lid 13 can be moved from the closed position) or may be between the open and closed positions. Thus, the imaging device 15 may be positioned at an optimal or otherwise desired position relative to a capsule to image a capsule when the lid 13 is at the open position, or the imaging device 15 may be better positioned for imaging the capsule when the lid 13 is somewhere between the open and closed positions. Note as well that although in this embodiment the imaging device 15 is arranged to capture a desired image of the capsule when the optical axis 15a is perpendicular to the capsule lid 25, this is not required in all embodiments. Instead, the imaging device 15 may be controlled to image the capsule when the optical axis 15a is at other angles relative to the capsule lid 25 or other capsule portion. Also, triggering of the imaging device to capture an image of the capsule 1 need not have any relation to an optical axis of an image sensor, and the imaging device 15 need not have an optical axis at all. Instead, the imaging device 15 may capture an image of the capsule 1 for a particular position or range of relative positions of forming station 11 parts that receive a capsule 1, such as relative positions of a lid 13 and capsule holder 12.

Figure 5:
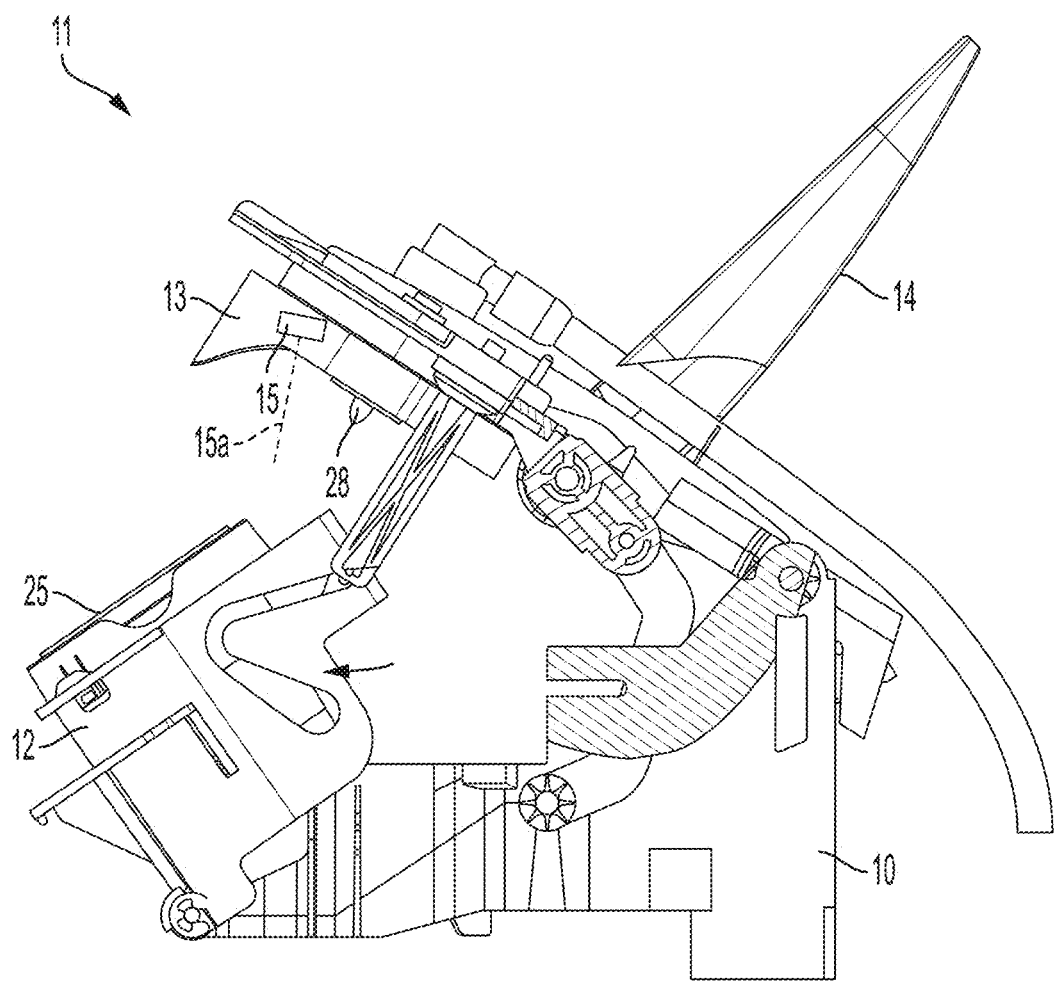
FIG. 5 is a side view of a beverage forming station in which a capsule holder and lid are movable relative to the beverage machine housing.
Figure 6:
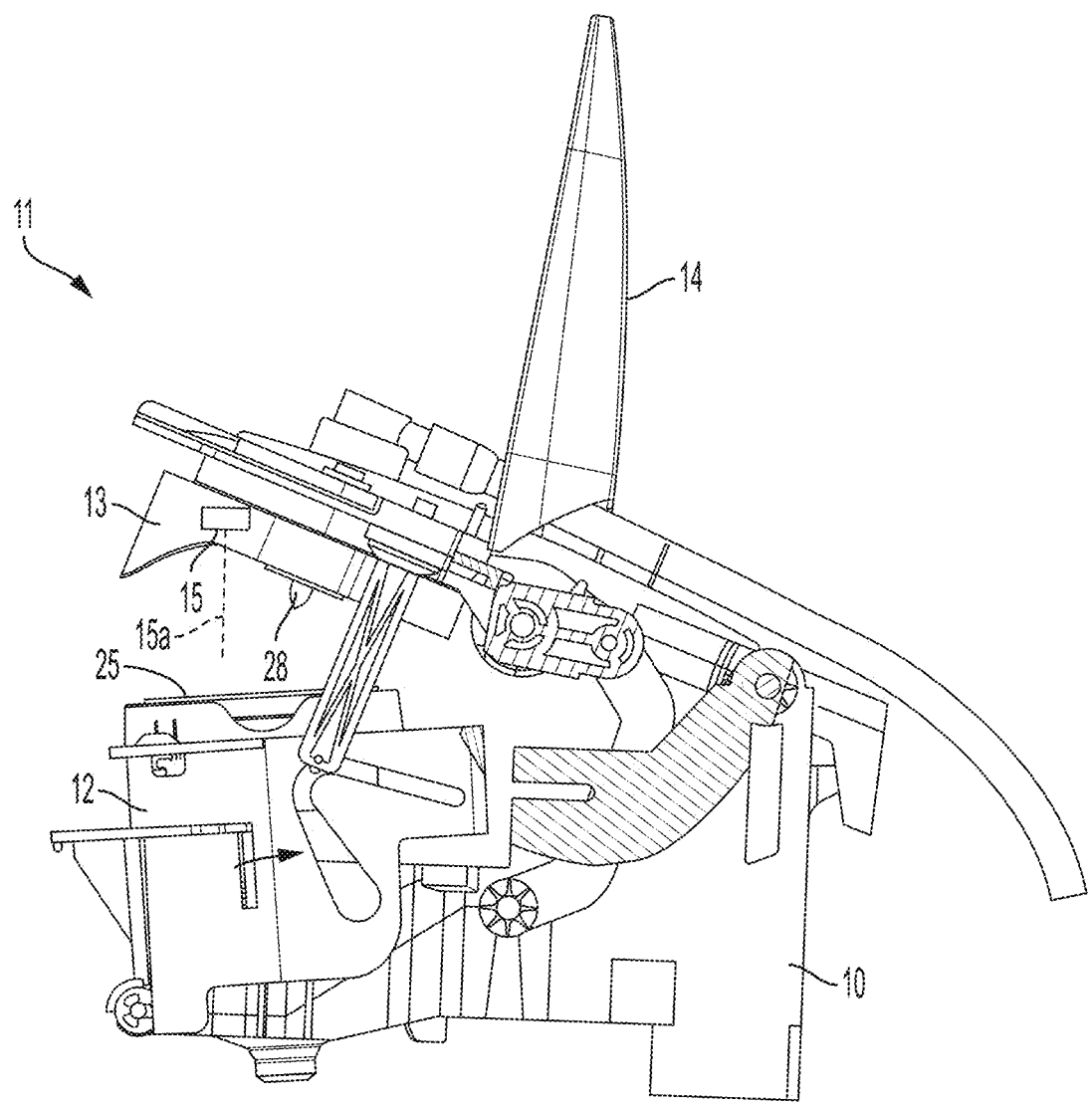
FIG. 6 is a side view of the FIG. 5 beverage forming station in which parts of the forming station are between open and closed positions.

FIGS. 5 and 6 show another beverage forming station 11 arrangement in which both a lid 13 and capsule holder 12 are movable relative to a housing 10 of the beverage machine 100. Details regarding operation of the beverage forming station 11, including movement of the lid 13 and capsule holder 12 are provided in U.S. Pat. No. 7,347,138, which is incorporated herein by reference. FIG. 5 shows the forming station 11 in an open position in which a capsule can be placed by a user into the forwardly-tilted capsule holder 1. An imaging device 15 is mounted to the lid 13, e.g., adjacent an inlet probe 28 which is arranged to introduce liquid into a capsule 1 to form a beverage. The optical axis 15a or other field of view of the imaging device 15 is oriented generally downwardly in FIG. 5, but not directed toward an area where the capsule 1 is received with the forming station 11 in an open position. However, as a user operates a handle 14 to move the forming station 11 toward the closed position, the capsule holder 12 rotates rearwardly and the lid 13 pivots downwardly. FIG. 6 shows the forming station 11 at a point between open and closed positions and in which the imaging device 15 field of view is directed toward the lid 25 of the capsule 1 in the capsule holder 12. At this point, the imaging device 15 may capture one or more images of the capsule 1, e.g., triggered by a sensor that detects a position of the lid 13 relative to the housing 10, a sensor that detects a position of the lid 13 relative to the capsule holder 12, a sensor that detects a position of the imaging device 15 relative to the capsule 1, or other arrangement. As in the examples above, the imaging device 15 may be controlled to capture one or more images of the capsule 1 only while the forming station 11 is being moved toward the closed position, and if the forming station 11 is moved toward the open position before a beverage is formed, any captured images may be discarded. Direction of movement of the forming station part(s) may be detected by any suitable sensor, such as a rotary encoder that detects rotation of the lid 13, an accelerometer mounted to the lid 13 and/or capsule holder 12, etc.

Figure 7:
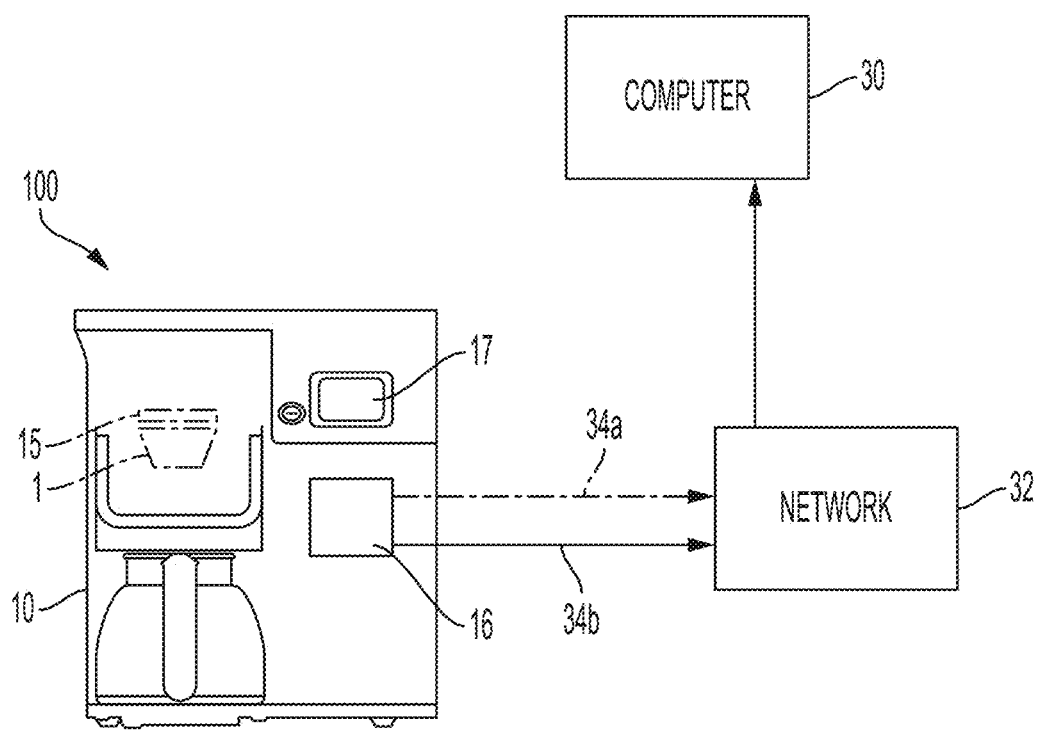
FIG. 7 is a schematic diagram of a beverage machine connected to a remote computer via a network in an illustrative embodiment.

According to another aspect, the beverage machine 100 is configured to transfer capsule image data to a remote computer. For example, as shown in FIG. 7, the machine 100 may transfer data to a remote computer 30 via a network 32. In some embodiments, the remote computer 30 includes a communications interface arranged to receive the capsule image data (e.g., undecoded capsule image data). The remote computer also may include memory arranged to store the data (e.g., the decoded indicia). In some embodiments, the controller 16 is arranged to transmit the capsule image data to the remote computer 30 during or after beverage formation cycle has completed (e.g., during or after a brew cycle). As will be appreciated, the controller 16 may include a data module and/or communications interface arranged to send the capsule image data to the remote computer 30. The controller 16 also may be configured to store the capsule image data in a memory of the beverage machine 100 after completion of the beverage formation, and to transmit the capsule image data from the memory to the remote computer 30 at a later time. For example, if the beverage machine does not have network connectivity (e.g., an Ethernet cable has been unplugged or a wireless connection has been interrupted), the controller 16 may store the capsule image data until the machine has reestablished network connectivity, at which point the capsule image data will be transmitted to the remote computer 30. As will be appreciated, in some embodiments, the beverage machine may not be configured to store the capsule image data in the memory, in which case the capsule image data may be discarded by the beverage machine (e.g., if there is no network connectivity).

According to another aspect, the beverage machine 100 is configured to capture and send beverage preparation parameters to the remote computer 30 (e.g., via the controller 16). In some embodiments, the controller is arranged to send both capsule image data and beverage preparation parameters to the remote computer 30. As will be appreciated, in other embodiments, the controller 16 may be arranged to send only capsule image data or only beverage preparation parameters to the remote computer 30. In some embodiments, the beverage preparation parameters recorded by the beverage machine include the day of the week, the time of day, the size (e.g., volume) of beverage prepared, the temperature of the water, the strength of beverage formed (e.g., strong, medium, weak), the type of beverage formed, and/or other apparatus settings (e.g., power settings, whether air was introduced into the precursor liquid during beverage formation, a carbonation level of the beverage, a location of the beverage machine during preparation of the beverage or an identity of a user associated with preparation of the beverage). As with the capsule image data, in some embodiments, the controller 16 is arranged to send the beverage preparation parameters to the remote computer upon completion of beverage formation cycle (e.g., after the brew cycle). In other embodiments, the beverage preparation parameters may be stored in memory and transmitted to the remote computer at a later time. In still another embodiment, the controller 16 may be configured to discard the beverage preparation parameters if the apparatus is not connected to the network.

According to still another aspect, the beverage machine 100 is arranged to transmit undecoded capsule image data to the remote computer (e.g., a remote server) that will decode the indicia stored in the capsule image data and store the decoded indicia (e.g., store the type of capsule or the beverage materials in the capsule). That is, in some embodiments the beverage machine does not itself decode the capsule indicia. Rather, the apparatus simply captures an image of a portion of the capsule and sends the raw capsule image data to the remote computer for processing. As shown in FIG. 7 the machine 100 may transmit the undecoded capsule image data to the remote computer 30 via a network 32 (e.g., the Internet and/or other wired or wireless networks, whether local or not).

In other embodiments, the machine 100 may be configured to decode the capsule indicia. As will be appreciated, in such embodiments, the imaging device may include an image decoder (e.g., a barcode reader, optical character recognition software, and/or other image analysis capability). In such embodiments, once network connectivity has been reestablished, the decoded indicia may be transmitted to the remote computer.

The beverage machine may 100 have one-directional communication with the remote computer 30 via the network 32. That is, the machine 100 may communicate with the remote computer 30 but may not receive communications therefrom. The remote computer 30 may have bi-directional communications ability with the machine 100, and/or other devices connected to the network 30, e.g., the computer 30 may be arranged to send communications directly to a user (e.g., to a user's telephone or e-mail). The beverage machine also may be arranged to have bi-directional communication with the remote computer (e.g., sending communications to and receiving communications from the remote computer). For example, the remote computer may send information to the machine 100 regarding a message that is displayed on a user interface 17 on the machine 100. In other embodiments, the remote server 30 may send decoded indicia (e.g., a beverage preparation parameter) back to the machine 100, which may then use the parameter to prepare the beverage.

In some embodiments, the beverage machine 100 is connected to the network 32 via a wireless connection 34*a* and/or a wired connection 34*b* (e.g., via an Ethernet cable). In some embodiments, the beverage machine may have a built-in wireless card that allows the apparatus to connect wirelessly to the network 32. The beverage machine 100 also may be connected to wireless adapter (e.g., a dongle) that allows the apparatus to establish a wireless connection with the network 32. In some embodiments, the user connects the beverage machine to the network 32 (e.g., so that the machine can transmit capsule image data to the remote computer 30). In one example, the user connects the machine to the network 32 by plugging an Ethernet cable into a port on the apparatus. In another example, the user connects the beverage machine to the network 32 by enabling wireless connectivity. That is, the user may use a peripheral device (e.g., a smartphone) to enable the apparatus' wireless connection to the network 32. In such an embodiment, the user may use a smartphone application with instructions on how to configure the wireless connection and/or with software to load onto the beverage machine. In other embodiments, the user enables wireless connectivity by simply pressing a button on the beverage machine.

According to some embodiments, the user may opt-in to allow the beverage machine to transmit information (e.g., the capsule image data and/or beverage preparation parameters) to the remote computer via the network. In such embodiments, the user may opt in by downloading an application on a peripheral device (e.g., a smartphone application) and/or by filling out form with name, phone number, email address, when he purchased the apparatus, etc.

According to another aspect, the remote computer is configured to track the number of capsules consumed by the user (e.g., the number of capsule used and/or the types of capsules used). In some embodiments, the remote computer may track consumption by tracking the number of capsule image data that the beverage machine sends to the computer. That is, the remote computer may tally the number of capsules that were imaged by the apparatus. In another embodiment, the remote computer may track consumption by tallying the information extracted from the decoded indicia. That is, the remote computer may count the number of each type of capsule used by the user. In still another embodiment, the remote computer tracks consumption without first identifying the capsule (e.g., without first imaging the capsule to know characteristic of the capsule). In such embodiments, the number of capsules used by the user may be calculated using the beverage preparation parameters. For example, the number of capsules used may be extrapolated from the number of beverage preparation cycles run by the beverage formation apparatus.

According to another embodiment, the remote computer is configured to determining a user's need for capsule replenishment based on the user's consumption and on past purchase history. In some embodiments, the remote computer determines when a user is in need of capsule replenishment by determining when the user's current supply of capsules falls below a threshold amount (e.g., less than a week's worth of capsules). In some embodiments, the remote computer determines the user's current capsule supply (e.g., a remaining number of unused capsules) by comparing the number of capsules purchased by the consumer (e.g., purchased from the beverage machine manufacturer, such as via an e-commerce website) and the number of capsules consumed by the user. The remote computer also may determine whether the number of remaining capsules has fallen below the threshold amount. The remote computer may run an algorithm to make such a calculation.

Figure 8:
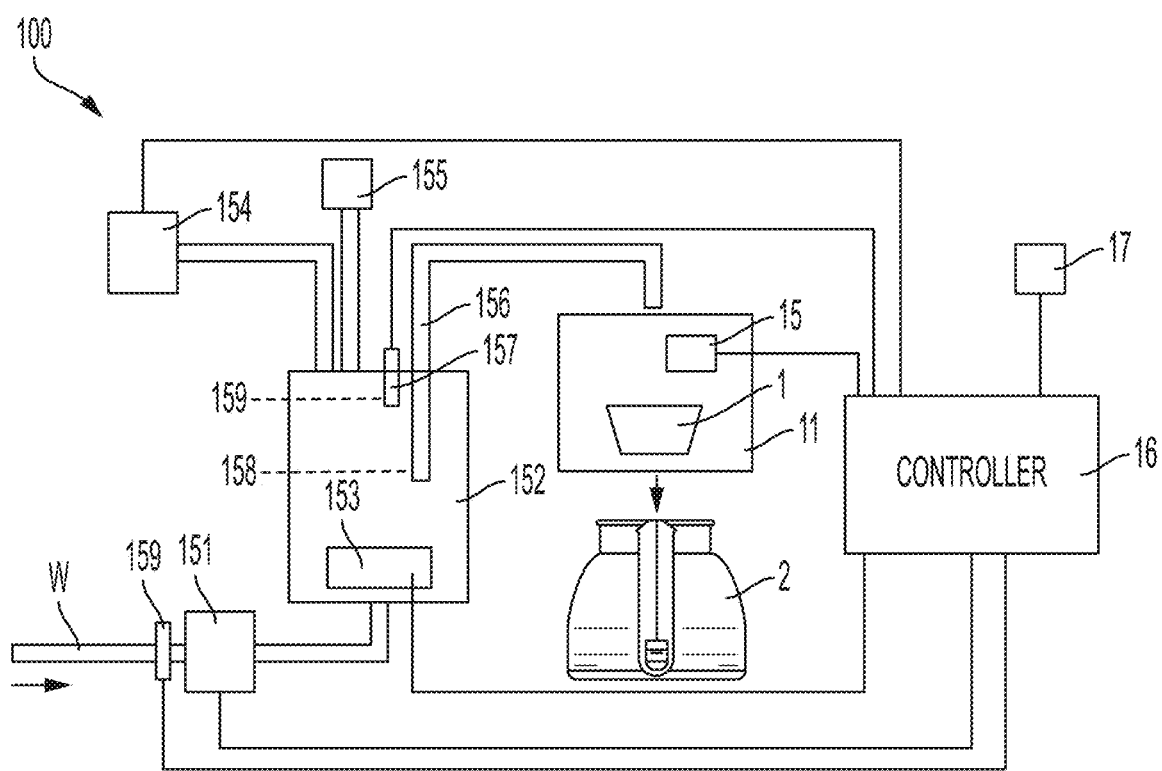
FIG. 8 is a schematic diagram of components of a beverage machine in an illustrative embodiment.

FIG. 8 shows a schematic block diagram of various components that may be included in a beverage machine 100 in one illustrative embodiment. Those of skill in the art will appreciate that a beverage forming apparatus 100 may be configured in a variety of different ways, and thus aspects of the invention should not be narrowly interpreted as relating only to one type of beverage forming apparatus. In this embodiment, water or other precursor liquid may be provided by a liquid supply to mix with a beverage material at a beverage forming station 11. The beverage material (such as coffee grounds, tea leaves, a powdered drink mix, etc.) may be provided in a capsule 1, or not, and beverage produced by mixing the liquid with the beverage material may be dispensed into the container 2 via a beverage outlet.

The liquid supply in this embodiment controls the volume of liquid provided to the beverage forming station 11 by filling a tank to a liquid dispense level 159 and then pressurizing the tank 152 by way of an air pump 154 so that liquid in the tank 152 is forced out of the conduit 156 to the beverage forming station 11. The volume of liquid delivered to the beverage forming station 11 is equal to the volume in the tank 152 between the liquid delivery level 159 and a post-delivery level 158 at a bottom of the conduit 156 in the tank 152. Since there is one delivery level 159 in this embodiment, one volume can be provided to the beverage forming station 11. However, two or more delivery levels may be used.

In this embodiment, the liquid supply provides liquid to the tank 152 via a valve 151 that is coupled to a source W. The source W may have any suitable arrangement, e.g., may provide liquid from a removable or fixed storage tank, a mains water supply or other source. Thus, in some cases, the liquid provided to the tank 152 may vary in temperature by a wide degree depending on various factors, such as time of year, a temperature of a room in which the machine 100 is located, etc. For example, if the source W is a reservoir that is filled by a user, the temperature of liquid in the reservoir may vary between room temperature (e.g., if liquid sits in the reservoir for an extended time) and a cooler temperature (e.g., if the reservoir has just been filled with water that is dispensed from a tap).

To provide liquid to the tank 152 in this embodiment, the valve 151 is controlled by the control circuit 16 to open and close to provide a desired volume of liquid to the tank 152. For example, if the tank 152 is empty or at the post-dispense level 158, the valve 151 may be opened until a conductive probe or other liquid level sensor 157 provides a signal to the control circuit 16 that indicates when liquid arrives at the dispense level 159. In response to the level sensor 157 detecting liquid at the sensor 157, the control circuit 16 may close the valve 151. Of course, other arrangements are possible, such using a pump to move liquid from a storage reservoir to the tank 152.

Although in this embodiment the liquid level sensor includes a conductive probe capable of contacting liquid in the tank 152 and providing a signal (e.g., a resistance change) indicative of liquid being present at respective dispense level 159 in the tank 152, the liquid level sensor may be arranged in other ways. For example, the sensor may include a microswitch with an attached float that rises with liquid level in the tank 152 to activate the switch. In another embodiment, the liquid level sensor may detect a capacitance change associated with one or more liquid levels in the tank, may use an optical emitter/sensor arrangement (such as an LED and photodiode) to detect a change in liquid level, may use a pressure sensor, may use a floating magnet and Hall effect sensor to detect a level change, and others. Thus, the liquid level sensor is not necessarily limited to a conductive probe configuration. Moreover, the liquid level sensor may include two or more different types sensors to detect different levels in the tank. For example, a pressure sensor may be used to detect liquid at a dispense level (e.g., complete filling of the tank 152 may coincide with a sharp rise in pressure in the tank 152), while a conductive probe may be used to detect liquid at the other dispense level 159.

Further, a liquid level sensor need not be used to fill the tank to the dispense level 159. Instead, other techniques may be used to suitably fill the tank 152, such as opening the valve 151 for a defined period of time that is found to correspond to approximate filling of the tank 152 to the desired level. Of course, other arrangements for providing liquid to the tank 152 are possible, such as by a pump (e.g., a centrifugal pump, piston pump, solenoid pump, diaphragm pump, etc.), gravity feed, or other, and the way by which the tank is filled to the dispense level 159 may depend on the technique used to provide liquid to the tank. For example, control of a volume of liquid provided to fill the tank 152 to the dispense level 159 may be performed by running a pump for a predetermined time, detecting a flow rate or volume of liquid entering the tank 152 (e.g., using a flow meter), operating a pump for a desired number of cycles (such as where the pump is arranged to deliver a known volume of liquid for each cycle), detecting a pressure rise in the tank 152 using a pressure sensor, or using any other viable technique.

Liquid in the tank 152 may be heated by way of a heating element 153 whose operation is controlled by the control circuit 16 using input from a temperature sensor or other suitable input. Of course, heating of the liquid is not necessary, and instead (or additionally) the apparatus 100 may include a chiller to cool the liquid, a carbonator to carbonate the liquid, or otherwise condition the liquid in a way that alters the volume of liquid in the tank 152. (Generally speaking, components of the liquid supply 15 that heat, cool, carbonate or otherwise condition liquid supplied to the beverage forming station 11 are referred to as a "liquid conditioner.")

In this embodiment, liquid may be discharged from the tank 152 by an air pump 154 operating to force air into the tank 152 to pressurize the tank and force liquid to flow in the conduit 156 to the beverage forming station 11. Since the conduit extends downwardly into the tank 152, the volume of liquid delivered to the forming station 11 is defined as the volume in the tank 152 between the dispense level 159 and the bottom end of the conduit 156. Again, liquid may be caused to flow from the tank 152 to the beverage forming station 11 in other ways. For example, a pump may be used to pump liquid from the tank 152 to the forming station 11, liquid may be allowed to flow by gravity from the tank 152, and others. A vent 155, which can be opened or closed to vent the tank 152, may be provided to allow the tank 152 to be filled without causing a substantial rise in pressure in the tank 152 and to allow liquid to be delivered from the tank 152 by pressurizing the tank using the air pump 154. In this embodiment, the vent 155 is actually not controlled by the control circuit 16, but remains always open with an orifice of suitable size to allow venting for filling of the tank 152, and air pressure buildup in the tank 152 to allow liquid delivery. Other flow control features may be provided as well, such as a check valve or other flow controller that can prevent backflow in the conduit between the source W and the tank 152, or between the tank 152 and the beverage forming station 11.

The beverage forming station 11 may use any beverage making ingredient, such as ground coffee, tea, a flavored drink mix, or other beverage medium, e.g., contained in a capsule 1 or not. Alternately, the beverage forming station 11 may function simply as an outlet for heated, cooled or otherwise conditioned water or other liquid, e.g., where a beverage medium is contained in the container 2. Once liquid delivery from the tank 156 to the station 11 is complete, the air pump 154 (or other air pump) may be operated to force air into the conduit 156 to purge liquid from the beverage forming station 11, at least to some extent.

Operation of the valve 151, air pump 154 and other components of the apparatus 100 may be controlled by the control circuit 16, e.g., which may include a programmed processor and/or other data processing device along with suitable software or other operating instructions, one or more memories (including non-transient storage media that may store software and/or other operating instructions), temperature and liquid level sensors, pressure sensors, input/output interfaces, communication buses or other links, a display, switches, relays, triacs, or other components necessary to perform desired input/output or other functions.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A beverage machine, comprising:
a capsule holder arranged to hold a capsule containing capsule ingredients to form a beverage,
a lid arranged to cooperate with the capsule holder to at least partially enclose the capsule held by the capsule holder with the lid and capsule holder in a closed position, the lid being movable relative to the capsule holder between an open position in which the capsule is receivable into the capsule holder and the closed position,
a precursor liquid supply including components to supply a precursor liquid used to form the beverage with the capsule ingredients,
an imaging device mounted to the lid and arranged to capture an image of a portion of the capsule in the capsule holder, the imaging device comprising a lighting element arranged to illuminate the portion of the capsule; and
control circuitry configured to control the imaging device to capture the image of the portion of the capsule in the capsule holder when the lid and the capsule holder are between the open and closed positions, and configured to control the lighting element to illuminate the portion of the capsule only when the lid and the capsule holder are between the open and closed positions.

2. The machine of claim 1, wherein the lid is movable relative to the capsule holder between open and closed positions.

3. The machine of claim 2, wherein the lid is in a horizontal position when in the closed position, and the lid is at an angle above the horizontal position when in the open position.

4. The machine of claim 3, wherein the imaging device has an optical axis that is oriented vertically downwardly when the lid is between the angle above the horizontal position and the horizontal position, and the control circuitry is arranged to control the imaging device to image the portion of the capsule when the optical axis is oriented vertically downwardly.

5. The machine of claim 2, wherein the control circuitry is arranged to control the imaging device to image the portion of the capsule only when the lid is moved toward the closed position.

6. The machine of claim 1, wherein the control circuitry is arranged to control the imaging device to image the portion of the capsule only when the lid and capsule holder are moved relative to each other toward the closed position.

7. The machine of claim 1, wherein the imaging device is arranged to capture an image of a portion of a lid of the capsule.

8. The machine of claim 7, wherein the lid of the capsule includes machine readable indicia including a barcode, alphanumeric text or a logo.

9. The machine of claim 8, wherein the machine readable indicia includes a barcode and alphanumeric text, and the image includes the barcode and alphanumeric text.

10. The machine of claim 9, wherein the control circuitry is adapted to decode the barcode and alphanumeric text from the image.

11. The machine of claim 9, wherein, when the beverage machine is not connected to a network, the beverage machine is arranged to decode the machine readable indicia.

12. The machine of claim 1, further comprising a user interface including a display, and wherein the control circuitry is adapted to present visual information regarding the capsule in the capsule holder on the display based on the image of the portion of the capsule.

13. The machine of claim 12, wherein the control circuitry is arranged to control the imaging device to image the portion of the capsule only when the lid and capsule holder are moved relative to each other toward the closed position, and wherein the control circuitry is adapted to present the visual information on the display when the lid and capsule holder reach the closed position.

14. A beverage machine, comprising:
- a beverage forming station including a capsule holder arranged to hold a capsule containing capsule ingredients to form a beverage, the beverage forming station including at least one part that is movable between open and closed positions, the open position being one in which the capsule may be provided to the capsule holder, and the closed position being one in which the capsule is at least partially enclosed and usable to form a beverage,
- a precursor liquid supply including components to supply a precursor liquid used to form the beverage with the capsule ingredients,
- an imaging device arranged to capture an image of a portion of the capsule held by the beverage forming station, the imaging device comprising a lighting element arranged to illuminate the portion of the capsule; and
- control circuitry configured to control the imaging device to capture the image of the portion of the capsule when the at least one part of the beverage forming station is between the open and closed positions and configured to control the lighting element to illuminate the portion of the capsule only when the at least one part of the beverage forming station is between the open and closed positions.

15. The machine of claim 14, wherein the control circuitry is arranged to cause the imaging device to capture the image only when the at least one part is being moved toward the closed position.

16. The machine of claim 14, wherein the beverage forming station includes a lid arranged to cooperate with the capsule holder to at least partially enclose the capsule held by the capsule holder with the lid and capsule holder in the closed position, the lid being movable to the open position in which the capsule is receivable into the capsule holder.

17. The machine of claim 16, wherein the imaging device is mounted to the lid.

\* \* \* \* \*